United States Patent [19]
Cottin et al.

[11] Patent Number: 6,030,676
[45] Date of Patent: *Feb. 29, 2000

[54] DECORATIVE LAMINATE FOR ELASTOMERIC ARTICLES

[75] Inventors: Alain Cottin, Clermont-Ferrand; Georges Peyron, Riom, both of France

[73] Assignee: Compagnie General Des Etablissements Michelin-Michelin & Cie, Cedex, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/828,839

[22] Filed: Mar. 24, 1997

[30] Foreign Application Priority Data

Mar. 26, 1996 [FR] France .................................. 96 03919

[51] Int. Cl.⁷ .................................................... B60C 13/00
[52] U.S. Cl. .............................. 428/64.1; 40/299; 40/327; 40/661; 428/66.5; 428/203; 428/204; 428/206; 428/207; 428/323; 428/331; 428/913.3
[58] Field of Search ................................ 428/64.1, 66.5, 428/41.6, 42.1, 323, 331, 913.3, 204, 201, 203, 206, 207; 40/299, 327, 661; 152/353 R

[56] References Cited

U.S. PATENT DOCUMENTS

| | | | |
|---|---|---|---|
| 4,419,436 | 12/1983 | Kranser | 428/41.6 |
| 4,461,795 | 7/1984 | Ogawa | 428/64.1 |
| 4,684,420 | 8/1987 | Bryant et al. | 156/116 |
| 4,855,171 | 8/1989 | McKie | 428/41.6 |
| 5,384,241 | 1/1995 | Itagaki et al. | 522/111 |

FOREIGN PATENT DOCUMENTS

| | | | |
|---|---|---|---|
| 60-259434 | 12/1985 | Japan . | |
| 05179092 | 7/1993 | Japan . | |
| 89/04257 | 5/1989 | WIPO | 428/41.6 |

*Primary Examiner*—Nasser Ahmad
*Attorney, Agent, or Firm*—Baker & Botts, L.L.P.

[57] ABSTRACT

A decorative laminate for articles of elastomeric material in which a layer of pigments is sandwiched between an adhesive covering and a protective covering. The two coverings are produced from aqueous emulsions of at least one homopolymer or a copolymer having a base of at least one monomer selected from the group consisting of acrylic, methacrylic and vinyl esters, and having a glass transition temperature less than 0° C.

17 Claims, No Drawings

DECORATIVE LAMINATE FOR ELASTOMERIC ARTICLES

BACKGROUND OF THE INVENTION

The present invention relates to coverings which can be applied to the surface of articles of elastomeric material, in particular tires, in order to decorate them and, in particular, coverings which can be applied after the vulcanizing of said articles.

The need to emphasize markings or ornamental designs on the surface of articles of prevulcanized elastomeric materials by means of a covering, such as a paint, has existed for a long time. By way of example, U.S. Pat. No. 2,088,561 proposes applying to the surface of a tire a liquid organic composition comprising pigments and rubber and U.S. Pat. No. 3,263,990 discloses the use of epoxy systems. All of these coverings have the major drawback of rapidly becoming detached from the surface of the covered tires.

In order to solve this problem, U.S. Pat. No. 4,670,496 proposes a liquid paint combining an organic solvent, a mixture of unvulcanized diene elastomers and accelerators, and pigments. This paint employs the free sulfur of the elastomeric mixtures on which it is applied in order to effect a cold vulcanization and thus create a durable bond.

Although it solved the problem of the durability of the bonding, this paint, however, has several drawbacks: the anti-ozone waxes and the antioxidant chemical agents can migrate through this paint and therefore the aesthetic appearance may be impaired due to the efflorescing of the waxes or the coloring due to the antioxidant chemical agents; the use of an organic solvent in a substantial amount raises problems of industrial hygiene; and finally the mixing of the pigments into the paint requires a large amount of pigments which are frequently very costly. The invention discloses a decorative laminate which substantially improves the preceding problems without degradation which is prejudicial to its adherence to the surface of the elastomeric article covered.

The mechanical behavior of the non-cross-linked polymers varies, as a function of the temperature, from a zone which is vitreous at low temperatures in which the behavior is vitreous, that is to say rigid and brittle, to a zone of fluid flow at high temperatures. Between these two zones there is a so-called "rubber plateau" in which the behavior is rubbery, that is to say close to that of an elastomer provided that the molecular weight of the polymer is sufficient so that there have been interlacings (see: "Viscoelastic Properties of Polymers," John D. Ferry, 3rd Ed., John Wiley & Sons, 1980, in particular Chapters 10, 12 and 13).

The "glass transition temperature" of a polymer ("Tg") is the temperature at which the mechanical behavior of the polymer evolves from this rigid, brittle vitreous behavior to this rubbery behavior. This glass transition temperature is an essential characteristic of polymers.

The glass transition temperatures are generally determined by differential enthalpy analysis (see Introduction to Thermal Analysis: techniques and applications—Michael E. Brown, Ed., Chapman and Hall, New York, 1988). This technique, better known by its acronym DSC (differential scanning calorimetry) consists of determining the variations in specific heat of a sample the temperature of which is increased. It makes it possible to show transitions or reactions which are accompanied by liberation of energy (exothermal) or the absorption of energy (endothermal). The glass transition is an endothermal transition.

SUMMARY OF THE INVENTION

The decorative laminate for articles of elastomeric material in accordance with the invention is composed of:

(a) an adhesive covering which can be obtained from a first aqueous emulsion of at least one first polymer called constituent I, said constituent I being a homopolymer or a copolymer having a glass transition temperature less than 0° C. and having as its base at least one monomer selected from the group consisting of acrylic, methacrylic and vinyl esters;

(b) a layer of pigments;

(c) a transparent covering which can be obtained from a second aqueous emulsion of at least:

(α) a polymer called constituent II, said constituent II being a homopolymer or a copolymer having a glass transition temperature less than 0° C. and having as base at least one monomer selected from the group consisting of acrylic, methacrylic and vinyl esters; and (β) a constituent III selected from the group formed of a hydrophilic silica and a homopolymer or a copolymer having a base of least one monomer selected from the group consisting of acrylic, methacrylic and vinyl monomers, said homopolymer or copolymer having a glass transition temperature greater than 25° C.

This laminate comprises a first adhesive covering obtained preferably with a constituent I of a glass transition temperature less than −15° C., and particularly with a copolymer of butyl acrylate and styrene having a styrene content by weight of about 20%. The glass transition temperature of such a polymer is −21° C.

Such an aqueous emulsion makes it possible to form a continuous flexible and adherent covering on the surface of the tire even in the absence of plasticizer. This covering opposing the migration to the surface of all the constituents capable of migrating in order to effloresce (free sulfur, waxes) present in the rubber mixtures of the tire without it being necessary to add a barrier agent such as mica.

This covering also has a sticky character which makes it suitable for receiving a layer of pigments, preferably lamellar, in order to impart a suitable artistic character to the laminate. The lamellar form of the pigment makes it possible, for the same quantity, considerably to improve the hiding power of the layer of pigments and thus to obtain decorative laminates of a very good appearance.

The fact of applying a continuous layer of pigments rather than including these pigments in the second aqueous emulsion makes it possible to obtain a very fine aesthetic appearance with a very substantially reduced amount of pigments.

The decorative laminate of the invention finally comprises a transparent covering applied after the layer of pigment, intended to fix and protect the layer of pigments, to impart to the entire unit a surface quality which is lasting and sufficiently flexible to withstand all the deformations suffered by the surface of a tire, even in current use. This laminate may preferably comprise a constituent II having a glass transition temperature less than −15° C., and particularly a copolymer of butyl acrylate and styrene having a styrene content about 20% by weight. The adhesive character of this covering is eliminated by the presence of a constituent III which may be a hydrophilic silica with a content by weight of between 1 and 25 parts to 100 parts of dry polymer. The silica content is preferably between 10 and 15 parts. The silica also reinforces the mechanical properties of the covering formed.

In accordance with a variant embodiment, the constituent III is a homopolymer or a copolymer having a base of at least one monomer selected from the group consisting of acrylic, methacrylic and vinyl monomers, said constituent III having a glass transition temperature of more than 25° C.

Such a constituent III can, in particular, be a copolymer or a mixture of homopolymers of ethyl acrylate and methyl methacrylate with a proportion by weight of ethyl acrylate of about 55%, or of polyvinyl acetate. In both of these cases, the proportion by weight of constituent III is between 35 and 55 parts by weight to 100 parts of dry polymer. Below 35 parts the adhesive character of the covering formed is frequently more marked and above 55 parts the covering obtained is rigidified and problems may be caused by deformations of the tires.

The constituent III may also be polyvinyl alcohol in a proportion of 10 to 50 parts by weight to 100 parts of dry polymer.

In accordance with another example, the constituent III is poly(N-vinyl-2-pyrrolidone) in a proportion of 10 to 40 parts by weight to 100 parts of dry polymer.

In these last two cases, when the content of constituent III exceeds the maximum values indicated, the covering formed becomes too rigid and too sensitive to the action of water.

The constituent III may also be a copolymer of polyvinyl alcohol and poly(N-vinyl-2-pyrrolidone).

In accordance with another variant of the invention, the second aqueous emulsion may comprise, in addition to the constituent II and a constituent III formed either of a copolymer or of a mixture of homopolymers of ethyl acrylate and methyl methacrylate with a proportion by weight of ethyl acrylate on the order of 55% or of polyvinyl acetate, a constituent IV formed of a homopolymer or a water-soluble vinyl copolymer selected from the group consisting of polyvinyl alcohols, poly(N-vinyl-2-pyrrolidones) and vinyl alcohol/N-vinyl-2-pyrrolidone copolymers.

This constituent IV preferably has a proportion less than or equal to 40 parts by weight to 100 parts of dry polymer in the second aqueous emulsion.

The addition of this constituent IV makes it possible to improve the wetting of the composition on the surface to be covered and the mechanical strength of the covering formed after drying.

This variant of the second aqueous emulsion of the invention of at least three constituents II, III and IV has, for 100 parts of dry polymer:

(a) from 50 to 75 parts of constituent II;
(b) from 15 to 28 parts of constituent III;
(c) from 7 to 25 parts of constituent IV.

The different variants of this second aqueous solution in accordance with the invention can all advantageously comprise a hydrophilic silica in a proportion of 1 to 25 parts by weight to 100 parts of dry polymer. This silica has a thixotropic effect which facilitates the application of the aqueous emulsion onto the surface to be covered. Furthermore, the silica content present in the composition makes it possible to have the appearance of the covering obtained evolve after drying from a bright appearance (content of 0 to about 10 parts) to a dull appearance (content on the order of 15 to 25 parts), passing through all possible shades.

The two aqueous emulsions of the invention may also advantageously include surface-active agents in order to favor the wetting on the surface to be covered.

They may also, in known manner, include anti-foaming agents in order to facilitate application with a gun:

In order to prepare the aqueous emulsions of the invention, there are introduced, one after the other, into a receptacle:

the water;
the silica, if necessary;
the surface-active agent;
the anti-foaming agent, if necessary;
the polyvinyl alcohol or polyvinyl pyrrolidone as the case may be and if necessary; and
the constituent I or the constituents II, III and IV as the case may be.

The introduction of the constituents of the aqueous emulsions is effected in the cold. Stirring is effected by the known means until obtaining complete dispersion of the products, whereupon the emulsion is filtered through a nylon cloth of 150 μm in order to eliminate any small lumps of poorly dispersed material.

Another object of the invention is a process producing a decorative laminate on the surface of a tire, in which:

at least one thin layer of a first aqueous emulsion is applied to said surface;
said layer is allowed to dry until an adhesive covering is formed;
the excess of pigment is blown away;
a layer of pigments is applied on the adhesive covering;
at least one layer of a second aqueous emulsions is applied on the layer of pigment; and
this layer is allowed to dry until a transparent covering has formed.

In accordance with this method, the thickness of the layer of the first aqueous emulsion deposited on the surface of the elastomeric article is such that, after drying, the thickness of the adhesive covering is between 3 and 10 μm.

Likewise, the thickness of the layer of the second aqueous emulsion deposited on the layer of pigments is such that, after drying, the thickness of said transparent covering is between 3 and 10 μm.

The aqueous emulsions can be applied by any known means and, in particular, by brush, roller or spraying with a gun. The layer of pigments may also be applied with a brush.

The application of the decorative laminate is preferably effected on the outer surface of articles made of new elastomeric materials in order to impart to them a more marked artistic character.

A preferred use of the decorative laminate of the inventions concerns the decorating of new tires in order to impart to them an artistic character of their own, particularly for presentations at automobile shows or showrooms.

Furthermore, as the mechanical strength of the decorative laminate formed is good, this laminate can remain in place after the tire have been placed in use.

This decorative laminate can also be applied to the surface of any tire at any time, usually after cleaning the surface to be decorated.

Even though the decorative laminate may be sensitive to abrasion and to impacts which the sidewalls of the tires might suffer in use, it has the other advantage of being eliminated by wear in the form of a fine powder without separating.

DESCRIPTION OF PREFERRED EMBODIMENTS

The invention is illustrated by the following examples intended for the decorating of tires, which do not constitute a limitation on its scope.

In the examples, the properties of the compositions are evaluated as follows:

"efflorescence": test of the ability of the laminate to oppose migration to the surface of all of the constituents capable of efflorescing;

"handling": test of the mechanical strength of the laminate upon operations of handling and mounting on the rim of the tires (this test imposes surface deformations of the sidewalls on the tires of more than 40% extension);

"dynamic resistance": test of the mechanical resistance of the laminate under dynamic stressing, 12,000 kilometers on a roller with an imposed sag of 35% at 60 kilometers per hour, this test imposing a dynamic deformation on the surface of the sidewalls on the order of 15% extension.

"rubbing": test of the mechanical resistance of the laminate upon operations of rubbing of the tires against each other;

"sidewalk scraping": rubbing of the covered sidewall of a tire against a sidewalk for several meters, test of the manner of elimination of the laminate due to mechanical rubbing, wear as powder or separation;

"water": test of the resistance of the laminate upon prolonged immersion in water; this is a simulation of lengthy storage of a vehicle on a parking lot in a pool of water;

"heat": test of the resistance of the laminate to heat in an oven at 50° C. for at least six months;

"mechanical resistance after aging": exposure to the elements of covered tires followed by a mechanical resistance test of the laminate;

"aging/appearance": visual observation of the aesthetic appearance of the laminate after depositing and in course of aging;

"washing": test of the resistance of the laminate to washing by rubbing in aqueous solution to which soap has been added;

"deposit": determination of the ease of application of the composition on a surface to be covered.

Table 1 shows the formulations of the coverings tested and Table 2 the results obtained. The formulations are presented on the basis of 100 parts of dry polymer.

TABLE 1

| Composition | First Emulsion A | Second Emulsion Intended to form the Protective Covering | | | | | | |
|---|---|---|---|---|---|---|---|---|
| | | B | C | D | E | F | G | H |
| PVA (1) | | | | 40 | | | | |
| PVP (2) | | | | | 30 | | | |
| AcBuSt (3) | 100 | 100 | 62 | 60 | 70 | 65 | 62 | 60 |
| AE/MM (4) | | | | | | 35 | 38 | 40 |
| PVAC | (5) | | | 38 | | | | |
| Silica (6) | | 13 | | | | | 21 | 12 |
| Glycerol Surface-active (7) | 9 | 9.0 | 9 | 13 | 10 | 13 | 17 | 12 |
| Anti-foaming (8) | 12 | 12 | 12 | 26 | 20 | 12 | 17 | |
| Total water | 250 | 370 | 630 | 1200 | 1000 | 310 | 530 | 690 |

TABLE 2

| Laminate Compositions | 1 A-B | 2 A-C | 3 A-D | 4 A-E | 5 A-F | 6 A-G | 7 A-H |
|---|---|---|---|---|---|---|---|
| Efflorescence | ++ | ++ | +++ | +++ | +++ | +++ | +++ |
| Handling | ++ | ++ | ++ | ++ | ++ | +++ | +++ |
| Dynamic resistance | +++ | +++ | ++ | ++ | +++ | +++ | +++ |
| Rubbing | ++ | ++ | ++ | ++ | ++ | +++ | +++ |
| Sidewall scraping | ++ | ++ | ++ | ++ | ++ | +++ | +++ |
| Water | +++ | + | + | + | +++ | +++ | +++ |
| Heat | ++ | +++ | ++ | +++ | +++ | +++ | +++ |
| Aging/mechanical strength | ++ | ++ | + | + | +++ | +++ | +++ |
| Aging/Appearance | ++ | + | ++ | ++ | ++ | +++ | +++ |
| Washing | +++ | +++ | + | + | +++ | +++ | +++ |
| Deposit | ++ | + | ++ | ++ | ++ | ++ | ++ |

The scale for the evaluation of the tests is as follows:
Excellent +++
Very good ++
Satisfactory +
Insufficient -
Very insufficient - -
Unacceptable - - -

All the coverings formed with the examples of compositions presented are very good to excellent in the efflorescence test.

Laminate 1, like all the examples presented, comprises an adhesive layer made with composition A having a base of a copolymer of butyl acrylate and styrene and a layer of lamellar pigments having a base of mica lamellae covered with titanium oxide in order to give metallized interference shades (pigments of the Iriodin® brand from Merck). The protective covering corresponds to composition B. This composition B is very close to composition A. The polymer has a glass transition temperature of −21° C.; therefore the laminate obtained has a rubbery appearance and resists well all the mechanical resistance tests with high deformations both statically and dynamically. This laminate is very good to excellent in all tests.

Another solution is presented with laminate 2 the protective covering of which is made with the emulsion C having a base of a mixture of a copolymer of butyl acrylate and styrene and of polyvinyl acetate. As compared with laminate 1, laminate 2 is better in the handling and heat resistance tests but is only acceptable with respect to resistance to water, due to a whitening which might be prejudicial in the case of a very dark pigment.

Examples 3 (emulsions A–D) and 4 (A–E) have their protective covering with a base of the same copolymer of butyl acrylate and styrene, to which polyvinyl alcohol (D) or polyvinyl pyrrolidone (E) is added. These two coverings have behaviors which are very close to each other and very good to excellent in all the tests, with the exception of the tests of resistance to water, washing and aging/mechanical strength, in which they are acceptable. This is due to the solubility of these two polymers in water.

The selection of a copolymer of ethyl acrylate and methyl methacrylate, as second constituent of the aqueous emulsion of the protective covering, corresponds to Example 5 (emulsions A–F). The covering obtained is better than the two preceding ones in the water and washing resistance tests. The mechanical resistance to aging is also improved.

The mechanical properties and the appearance of the covering formed can be further improved by adding silica to the composition of Example 5, namely Example 6 (emulsions A–G).

A preferred example of a laminate in accordance with the invention is Example 7 (emulsions A–H). Its formulation is very close to Example 6 with a smaller amount of silica, and it gives a covering of a slightly brighter appearance. This formulation does not contain anti-foaming agent and this does not degrade the depositing properties of the film.

In all cases, the increase in the amount of silica makes it possible to vary the appearance of the resultant laminate from bright to dull.

In order to evaluate a marked advantage of the laminate in accordance with the invention, a final specific test of resistance to ozone was carried out on laminate 7, the so-called Volkswagen test. The purpose of this test is to evaluate the resistance to ozone of a tire sidewall. This is a static test carried out on a piece of tire of 2 cm in width taken between the bead wire and the tread plies. The piece thus obtained is fastened on a 20-millimeter rayon tube by a copper wire. The surface deformation is about 12. The test specimens thus prepared are exposed in an ozone oven under the following conditions: Ozone concentration 200±15 pphm (parts per hundred million)

| Relative humidity | 60 ± 5% |
|---|---|
| Temperature | 25 ± 2° C. |
| Time | 46 hours |

The test is passed when visual observation does not disclose any incipient fissure.

A tire was aged for four months and then protected half by a decorative laminate in accordance with the invention. Control test pieces—without protective laminate—and protected test pieces were then taken and tested.

The control test pieces show pronounced cracks.

The test pieces protected by the decorative laminate show no trace of cracking on the areas protected by the laminate in accordance with the invention.

This test, the most stringent of all the tests required by automobile manufacturers, clearly shows the effectiveness of the decorative laminate in protecting the surface of the tires from the action of ozone.

We claim:

1. A decorative laminate for articles of elastomeric material comprising:

(a) an adhesive covering layer comprising at least one first polymer called constituent I, said constituent I being a homopolymer or copolymer having a glass transition temperature less than 0° C. and having as base at least one monomer selected from the group consisting of acrylic, methacrylic and vinyl esters;

(b) a transparent covering layer comprising
      (i) a polymer called constituent II, said constituent II being a homopolymer or a copolymer having a glass transition temperature less than 0° C. and having as base at least one monomer selected form the group consisting of acrylic, methacrylic and vinyl esters; and
      (ii) a constituent III selected from the group consisting of a hydrophilic silica and a homopolymer or a copolymer having a base of at least one monomer selected from the group consisting of acrylic, methacrylic and vinyl monomers, said homopolymer or copolymer having a glass transition temperature of more than 25° C. and (c) a layer of pigments in between said adhesive covering layer and said transparent covering layer.

2. A decorative laminate according to claim 1, in which the constituent I and/or the constituent II have a glass transition temperature less than −15° C.

3. A decorative laminate according to claim 1, in which the constituent I and/or the constituent II are a copolymer of butyl acrylate and styrene with a styrene content on the order of 20% by weight.

4. A decorative laminate according to claim 1, in which the constituent III is a hydrophilic silica in a proportion of 5 to 25 parts by weight to 100 parts of dry polymer.

5. A decorative laminate according to claim 4, in which the content of hydrophilic silica is between 10 and 15 parts by weight to 100 parts of dry polymer.

6. A decorative laminate according to claim 1 in which the constituent III is a copolymer mixture of homopolymers of ethyl acrylate and methyl methacrylate.

7. A decorative laminate according to claim 6, in which the constituent III has a proportion by weight of ethyl acrylate on the order of 55%.

8. A decorative laminate according to claim 1, in which constituent III is polyvinyl acetate.

9. A decorative laminate according to either of claims 7 and 8, in which the proportion by weight of said constituent III is between 35 and 55 parts to 100 parts of dry polymer.

10. A decorative laminate according to claim 1, in which the constituent III is polyvinyl alcohol in a proportion by weight of 10 to 50 parts to 100 parts of dry polymer.

11. A decorative laminate according to claim 1, in which the constituent III is poly(N-vinyl-2-pyrrolidone) in a proportion by weight of 10 to 40 parts to 100 parts of dry polymer.

12. A decorative laminate according to any of claims 6 to 8, wherein said transparent covering layer further comprises a constituent IV, said constituent IV being a homopolymer or a vinyl copolymer selected from the group consisting of polyvinyl alcohols, poly (N-vinyl-2-pyrrolidones) and vinyl alcohol/N-vinyl-2-pyrrolidone copolymers.

13. A decorative laminate according to claim 12, in which the constituent IV has a proportion by weight less than or equal to 40 parts to 100 parts of dry polymer.

14. A decorative laminate according to claim 13 wherein said transparent covering layer comprises for 100 parts by weight of dry polymer:

(a) from 50 to 75 parts of constituent II;
(b) from 15 to 28 parts of constituent III; and
(c) from 7 to 25 parts of constituent IV.

15. A decorative laminate according to any of claims 6 to 8, 10 and 11, wherein said transparent covering layer further comprises a hydrophilic silica in a proportion by weight of 1 to 30 parts to 100 parts of dry polymer.

16. A decorative laminate according to claim 1, in which the pigments are lamellar pigments.

17. A tire comprising a decorative laminate comprising:

(a) an adhesive covering layer comprising at least one first polymer called constituent I, said constituent I being a homopolymer or copolymer having a glass transition temperature less than 0° C. and having as base at least one monomer selected from the group consisting of acrylic, methacrylic and vinyl esters;

(b) a transparent covering layer comprising (i) a polymer called constituent II, said constituent II being a homopolymer or a copolymer having a glass transition temperature less than 0° C. and having as base at least one monomer selected form the group consisting of acrylic, methacrylic and vinyl esters; and (ii) a constituent III selected from the group consisting of a hydrophilic silica and a homopolymer or a copolymer having a base of at least one monomer selected from the group consisting of acrylic, methacrylic and vinyl monomers, said homopolymer or copolymer having a glass transition temperature of more than 25° C.; and (c) a layer of pigments in between said adhesive covering layer and said transparent covering layer.

* * * * *

UNITED STATES PATENT AND TRADEMARK OFFICE
CERTIFICATE OF CORRECTION

PATENT NO. : 6,030,676
DATED : February 29, 2000
INVENTOR(S) : Cottin et al.

Page 1 of 2

It is certified that error appears in the above-identified patent and that said Letters Patent is hereby corrected as shown below:

Title page,
Item [56] References Cited, FOREIGN PATENT DOCUMENTS, "05179092/1993 Japan" should read -- 5-179092/1993 Japan --.

Item [73] Assignee, "General Des" should read -- Générale Des --.

Column 4,
Line 14, "gun:" should read -- gun. --.

Column 6,
Table 1, column "Composition": "PVAC" should read -- PVAc (5) --.
Table 1, column "A", row "PVAC": "(5)" should be deleted.
Table 1, column "C", row "PVAC": -- 38 -- should be inserted.
Table 1, column "D", row "PVAC": "38" should be deleted.
Line 19, please insert the following:

(1) Polyvinyl alcohol: Rhodoviol 25/140 (Rhone-Poulenc)
    (Tg: +49 °C***);
(2) Polyvinyl Pyrrolidone: Luviskol K 90 BASF)
    (Tg: about + 175 °C*);
(3) 50% aqueous emulsion of a butyl acrylate/styrene copolymer: Rhodopas GS 125 (Rhone-Poulenc)
    (Tg: -21 °C**);
(4) 40% aqueous emulsion of a copolymer of ethyl acrylate and methyl methacrylate
    (Tg: +34 °C***);
(5) 54% aqueous emulsion of polyvinyl acetate
    (Tg: 28 to 31 °C*);
(6) Hydrophilic amorphous silica: Aerosil 200 (Degussa);
(7) Nonionic surface-active agent: Ethylene Octyl Phenyl Polyoxide (Cinnopal OP9 of Henkel);
(8) Anti-foaming agent: BYK 070 (BYK).

\* Reference: Encyclopedia of Chemical Technology, 3rd Edition, Vol 23.
\*\* Reference: Rhone-Poulenc measurements.
\*\*\* Reference: In-house measurements.

UNITED STATES PATENT AND TRADEMARK OFFICE
CERTIFICATE OF CORRECTION

PATENT NO. : 6,030,676
DATED : February 29, 2000
INVENTOR(S) : Cottin et al.

It is certified that error appears in the above-identified patent and that said Letters Patent is hereby corrected as shown below:

Column 8,
Line 17, "25 °C. and" should read -- 25 °C.; and --.

Column 10,
Line 4, "form" should read -- from --.

Signed and Sealed this

Fifteenth Day of January, 2002

Attest:

JAMES E. ROGAN
*Director of the United States Patent and Trademark Office*

*Attesting Officer*